(12) United States Patent
Bromley (10) Patent No.: US 7,120,654 B2
(45) Date of Patent: Oct. 10, 2006

(54) SYSTEM AND METHOD FOR NETWORK-FREE FILE REPLICATION IN A STORAGE AREA NETWORK

(75) Inventor: Graham Bromley, Dublin, CA (US)

(73) Assignee: VERITAS Operating Corporation, Cupertino, CA (US)

( * ) Notice: Subject to any disclaimer, the term of this patent is extended or adjusted under 35 U.S.C. 154(b) by 515 days.

(21) Appl. No.: 10/224,940

(22) Filed: Aug. 20, 2002

(65) Prior Publication Data

US 2004/0039756 A1    Feb. 26, 2004

(51) Int. Cl.
*G06F 17/30* (2006.01)

(52) U.S. Cl. .................... 707/204; 707/200; 707/201; 707/203; 711/161; 711/162

(58) Field of Classification Search ........ 707/200–205; 711/161, 162
See application file for complete search history.

(56) References Cited

U.S. PATENT DOCUMENTS

| | | | |
|---|---|---|---|
| 5,991,542 A | 11/1999 | Han et al. | 717/167 |
| 6,029,168 A | 2/2000 | Frey | 707/10 |
| 6,385,706 B1 | 5/2002 | Ofek et al. | 711/162 |
| 6,629,264 B1 * | 9/2003 | Sicola et al. | 714/15 |
| 6,633,904 B1 * | 10/2003 | Shinkai | 709/213 |
| 6,728,848 B1 * | 4/2004 | Tamura et al. | 711/162 |
| 6,826,666 B1 * | 11/2004 | Berkowitz et al. | 711/162 |
| 2003/0028514 A1 * | 2/2003 | Lord et al. | 707/1 |
| 2004/0002934 A1 * | 1/2004 | Taulbee et al. | 707/1 |
| 2004/0073677 A1 * | 4/2004 | Honma et al. | 709/226 |

FOREIGN PATENT DOCUMENTS

WO    92/18931    10/1992

OTHER PUBLICATIONS

Art Licht, "LAN-Free Backups Using the SunStoEdge Instant Image 3.0 Software", Sun Microsystem, Inc., Sun BluePrints Online, Jun. 2002.*

"Storage Area Networking—High-Speed Data Sharing Among Multiple Computer Platforms", *Tivoli Systems, Inc., Copyright 2000*, http://www.tivoli.com/products/documents/whitepapers/san_datasharing_wp.pdf, (2000), 4 pages.

"Storage Management—Best Practices", *Copyright 2001, IBM Corp.*, http://www.tivoli.com/products/documents/whitepapers/wp-storage-bp.pdf,(2001), 11 pages.

(Continued)

*Primary Examiner*—Khanh B. Pham
(74) *Attorney, Agent, or Firm*—Meyertons Hood Kivlin Kowert & Goetzel, P.C.; B. Noël Kivlin (57) ABSTRACT

A secondary host on a storage area network (SAN) replicates files utilized and/or managed by a primary host by direct transfer of the files over the SAN to achieve substantially network free file replication. The secondary host receives SAN-relative extent information from the primary host system, converts the SAN-relative extent information to local extent information that is used by the secondary host to retrieve the files directly from disk storage on the SAN. The secondary host may then retrieve the files from the SAN using the local extent information, and may store the files on storage elements of the SAN thus creating a copy of the files. The SAN-relative extent information may be received over an external network from the primary host system. The SAN-relative extent information may physically identify actual storage elements and may include an identifier that uniquely identifies the storage elements on the SAN. The SAN-relative extent information may include, for example, a worldwide name (WWN) to uniquely identify a storage element on the SAN.

25 Claims, 4 Drawing Sheets

OTHER PUBLICATIONS

Amiri, Khalil S., "Scalabale and manageable storage systems", *Ph.D. Thesis, Dept. of Electrical and Computer Engineering, Carnegie Mellon University, Pittsburgh, PA*, http://www.pdl.cmu.edu/PDL-FTP/NASD/amiri_thesis.pdf,(Dec. 2000),i-241.

Wylie, Jay J., "Selecting the Right Data Distribution Scheme for a Survivable Storage System", *Research Paper, School of Computer Science, Carnegie Mellon University, Pittsburgh, PA*, http://www.pdl.cmu.edu/PDL-FTP/Storage/CMU-CS-01-120.pdf,(May 2001), pp. 1-21.

Anonymous: "Tivoli Storage Manager Version 3.7.3 & 4.1: Technical Guide", Internet Article, IBM Corporation, International Technical Support Organization, 'Online! Sep. 2000, pp. 264-281, XP002270877, http:/www.redbooks.ibm.com/redbooks/pdfs/sg246110.pdf.

Anonymous: "Storage Area Networking: Building a SAN Using Hewlett-Packard's SureStore E SAN Manage LUN Management", Internet Article, Hewlett Packard, Nov. 1, 1999, XP002231736, http:/www.hpindia.com/pdf_files/bldgasan.pdf.

Oguchi, M, et al: "Performance Analysis of Runtime Data Declustering Over SAN-Connected PC Cluster", Proceedings of the IASTED International Conference Applied Informatics. International Symposium on Parallel and Distributed Computing and Networks, International Symposijm on PAR, pp. 300-307, XP002270878, 2001, Anaheim, CA, ISBN: 0-88986-321-0.

Anonymous: "SAN Basics. A Technical White Paper from MetaStor Storage Solutions", Internet Article, MetaStor, Online! Sep. 1999, pp. 1-11, XP002270879, http:/www.gocmt.com/tec/wp/SAN-WP.pdf.

International search report application No. PCT/US03/25945 mailed Mar. 5, 2004.

* cited by examiner

SYSTEM AND METHOD FOR NETWORK-FREE FILE REPLICATION IN A STORAGE AREA NETWORK

CROSS-REFERENCE TO RELATED APPLICATIONS

This application is related to the following co-pending, commonly assigned U.S. patent applications, which are incorporated herein by reference: METHODS, FUNCTIONAL DATA, AND SYSTEMS TO REPRESENT A STORAGE ENVIRONMENT, Ser. No. 09/997,602, filed Nov. 29, 2001; METHODS AND SYSTEMS TO BACKUP DATA, Ser. No. 10/086,597, filed Feb. 02, 2002; METHODS, SYSTEMS, AND APPARATUS TO INTERFACE WITH STORAGE OBJECTS, Ser. No. 09/997,612, filed Nov. 29, 2001; and METHODS AND SYSTEMS TO ACCESS STORAGE OBJECTS, Ser. No. 09/997,350 filed Nov. 29, 2001.

TECHNICAL FIELD

The present invention relates to networks including storage area networks (SANs), and in particular, to replication of files and file data stored on SANs.

BACKGROUND

Storage area networks (SANs) are used to connect computing devices and storage devices over a high-bandwidth network communication path such as a fibre channel. Unlike traditional networks that utilize point-to-point communication paths and have distributed file systems, SANs may allow all computing devices access to each of the storage devices. Connectivity is shared among the computing devices and the storage devices within a SAN environment. Although the speed of connections between platforms on a SAN is significantly greater than that of distributed file systems, the basic method of using distributed file system techniques to share data on a SAN may limit the ability of computing devices connected to a SAN to achieve the high performance file replication that may be possible on a SAN. For example, because these computing devices utilize distributed file system techniques, file replication between computing devices on a SAN conventionally requires sending the files over an external network, such as a local area network (LAN) or wide area network (WAN). File replication using an external network is undesirable because it may consume most or all of the limited bandwidth of the external network restricting other network communications. Furthermore, external networks are generally not designed to handle file replication, which may require the transfer of very large amounts of data. Another disadvantage is a possible security risk associated with transferring files and file extents over an external network.

Another problem with SANs is that, because of the file and volume management systems utilized by conventional server platforms, SANs are unable to achieve high performance file replication, which may be desirable for server platform fail-over. Fail-over refers to a situation where, for example, recovery of a failed storage device may be achieved through another operational server device. In server platform fail-over, it may be desirable to replicate files without excessive consumption of resources of an external network.

Thus there is a general need for an improved system and method for file replication in a SAN environment. There is also a general need for a system and method that achieves improved file replication without significant use of an external network. There is also a general need for an improved system and method for server platform fail-over in a SAN environment.

BRIEF DESCRIPTION OF THE DRAWINGS

The appended claims are directed to some of the various embodiments of the present invention. However, the detailed description presents a more complete understanding of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

In accordance with an embodiment, a secondary host on a storage area network (SAN) replicates files utilized and/or managed by a primary host by direct transfer of the files over the SAN to achieve substantially network free file replication. In accordance with one embodiment, the secondary host may receive SAN-relative extent information from the primary host system, and may retrieve file extents identified by the SAN-relative extent information. The secondary host may translate the SAN-relative extent information to equivalent local extent information relative to the secondary host. The secondary host may also retrieve the file extents using the local extent information, and may store the file extents on storage elements of the SAN, thus effecting a replication of the files managed by the primary host. The SAN-relative extent information may be received over an external network from the primary host system. The external network may be, for example, a wide area network (WAN) or a local area network (LAN). The SAN-relative extent information uniquely identifies storage elements of the SAN. In one embodiment, file replication by the secondary host may be performed on a regular basis and may allow the secondary host to serve in a hot standby mode in the event of failure of the primary host.

Figure 1:
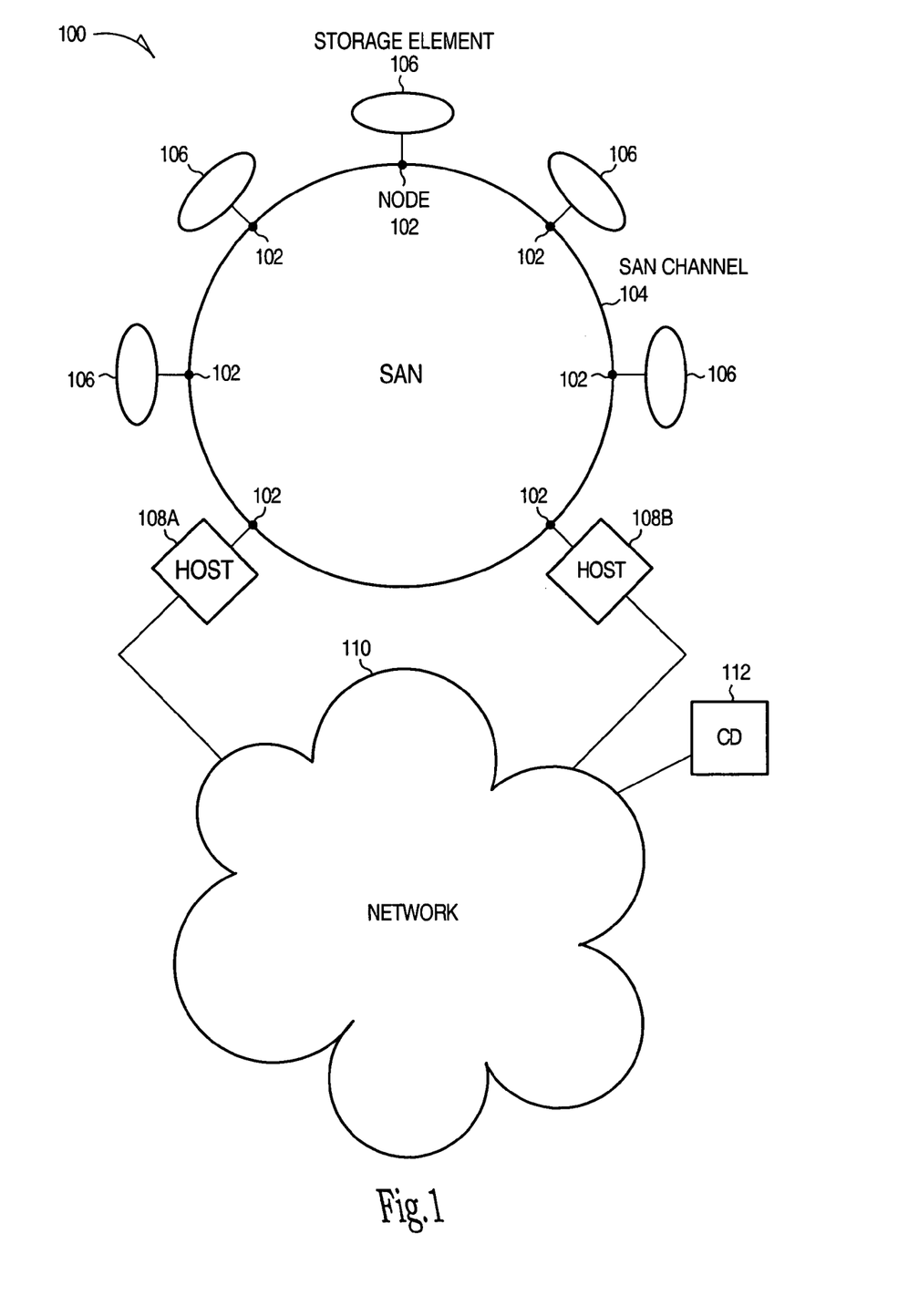
FIG. 1 illustrates a storage area network (SAN) in accordance with an embodiment of the present invention.

FIG. 1 illustrates a storage area network (SAN) in accordance with an embodiment of the present invention. SAN 100 may include a plurality of nodes 102 coupled by channel 104. Channel 104 maybe any communication channel including a fibre channel comprised of one or more optical fibers or a channel comprised of other communication media. Channel 104, for example, may provide up to optical carrier level 48 (OC-48) communications (approximately 2.5 Gbps), OC-192 communications (approximately 9.9 Gbps) or even greater. Nodes 102 may couple with one or more storage elements 106 as well as with one or more computing devices such as computing devices 108A and 108B (which may collectively be referred to herein as computing devices 108). For convenience, only a few storage elements 106 and computing devices 108 are illustrated in FIG. 1, although SAN 100 may couple with many hundreds or even thousands or more of storage elements 106 and/or computing devices 108.

Storage elements 106 provide physical data storage and may be comprised of storage devices, which may include one or more hard (e.g., magnetic media) disk drives, optical disks, tape drives, and/or RAM memory configured to store large amounts of data in a digital form. SAN 100 may view each storage element 106 as a single storage volume. Data stored on one of storage elements 106 may be accessed by one of computing devices 108, for example, by specifying a volume offset and size. Internal volume managers within the storage element may perform any necessary translation for situations where multiple internal storage devices are used within one of storage elements 106. In one example, one or more of storage elements 106 may be a disk array, which may appear as a single disk to SAN 100.

Computing devices 108 may include, for example, server-type systems as well as other computer systems including personal computers (PCs). In an embodiment of the present invention, computing devices 108 may serve as host systems and may be referred to as hosts. Computing devices 108 may communicate with each other over network 110, and may utilize a network communication technique that may include the use of a predetermined protocol. In one embodiment, network 110 may be local area network (LAN) or a wide area network (WAN) and may implement Ethernet communications between computing devices 108. In another embodiment, network 110 may be a wireless LAN and may implement wireless communication techniques between computing devices 108, including wireless communications in accordance with one or more of the IEEE 802.11 standards. In yet other embodiments, network 110 may be a transmission control protocol/internet protocol (TCP/IP) network such as the Internet or an intranet, or may be a network implementing a universal datagram protocol (UDP) communication technique. Network 110 may also provide communications with other computing devices (CDs) 112 which may not be coupled to SAN 100.

In an embodiment of the present invention, any of computing devices 108 may utilize the storage capacity of one or more of storage elements 106. In general, each computing device 108 may view the storage capacity of storage elements 106 of SAN 100 as it would view an internal disk drive. Channel 104 may provide high speed, high bandwidth digital communications therebetween in accordance with a predetermined communication technique. In general, storage objects, such as files, which are utilized and managed by a particular one of computing devices 108, may be stored on one or more of storage elements 106 and accessed using channel 104. In one embodiment, portions of a storage object may be distributed among the various storage elements 106. Although channel 104 is illustrated as a ring for ease in understanding an embodiment of the present invention, in other embodiments, channel 104 may couple nodes 102 in a mesh-type configuration (such as switching fabric), which may also provide each computing device 108 with access to each storage element 106.

The collective storage capacity of storage elements 106 may be shared by computing devices 108 allowing any particular computing device 108 to have a significant amount of storage capacity at its disposal. In one embodiment, SAN 100 may include several thousand or more storage elements providing storage capacities of up to several hundred terabytes and even greater. A file system and/or volume management system may be utilized to manage the storage of storage objects among storage elements 106 for computing devices 108.

In accordance with an embodiment of the present invention, a secondary host, such as computing device 108B may replicate file extents, which are utilized and/or managed by a primary host, such as computing device 108A. The secondary host may directly transfer file extents over SAN 100 to achieve substantially network free file replication. The secondary host may receive SAN-relative extent information from the primary host system, and may retrieve file extents identified by the SAN-relative extent information directly over the SAN. The SAN-relative extent information may be generated by the primary host and may uniquely identify one or more storage elements of the SAN for each file extent. The SAN-relative extent information identifies physical storage elements and may include any identifier that uniquely identifies the storage elements on the SAN. The SAN-relative extent information may be comprised of SAN-relative file extent descriptors. In one embodiment, the SAN-relative extent information may include, for example, a world wide name (WWN), and/or a disk serial number, combined with other parameters that may together uniquely identify a storage element on the SAN. Other parameters, which may be used to uniquely identify a storage element on a SAN, include, for example, a vendor ID, a product ID and/or a device serial number. A file extent refers to a contiguous region of data in a storage element. A file extent descriptor may include a device identifier, offset and length for the file extent. A SAN-relative file extent descriptor may include a device identifier relative to the SAN, while a local file extent descriptor may include a device identifier relative to a local host.

In one embodiment, a primary host generates the SAN-relative extent information. A file extent descriptor may be mapped to a SAN-relative file extent descriptor. The SAN-relative file extent descriptors may be sent to the secondary host over an external network and translated to local extent descriptors. A local extent descriptor may include a local storage element identifier, offset and length. In this way, the secondary host may retrieve and store the file extents on storage elements of the SAN in accordance with its own local extent information. The SAN-relative extent information may be received over an external network, such as network 110, from the primary host.

The primary and secondary hosts may be server platforms and in one embodiment, file replication by the secondary host may be performed on a regular basis and may allow the secondary host to serve in a hot standby mode in the event of failure of the primary host. In this embodiment, the primary and secondary hosts may be co-located geographically, although this is not a requirement. In this embodiment, both the primary host and the secondary host may operate software to configure the hosts to perform the various operations described herein.

In another embodiment, the files replicated by the secondary host may be stored at physically distinct storage elements of a SAN, which may be located at different geographic locations from the storage elements utilized by the primary host. For example, one storage element 106 may be located in a physical location, such as a building or a geographic region (e.g., a state), while another storage element 106 may be located in another building or another geographic region. An advantage to physical separation of some of storage elements 106 is that failure or destruction of a storage element due to fire, earthquake, terrorist attack and/or other disaster, may help prevent loss of data stored on a failed or destroyed storage element when, for example, the data is replicated on one or more other geographically distinct storage elements.

Accordingly, network-free file replication may be achieved because unlike conventional file replication techniques, file data does not need to be transferred over network 110 allowing the communication resources of network 110 to be utilized for other communications. In the example described above, network 110 may be utilized primarily for transferring extent information, rather than actual file extents, thereby significantly reducing the load on network 110.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the system's registers or memories, or other such information storage, transmission or display devices. Furthermore, as used herein, computing device includes one or more processing elements coupled with computer readable memory, which may be volatile and/or non-volatile memory or combinations thereof. Moreover, as used herein, data refers to one or more data elements, which can include portions of files, a single file, a file extent, a database, a storage device partition, a volume, sets of volumes and the like. The data need not reside on a single storage device and may span multiple storage devices.

Figure 2:
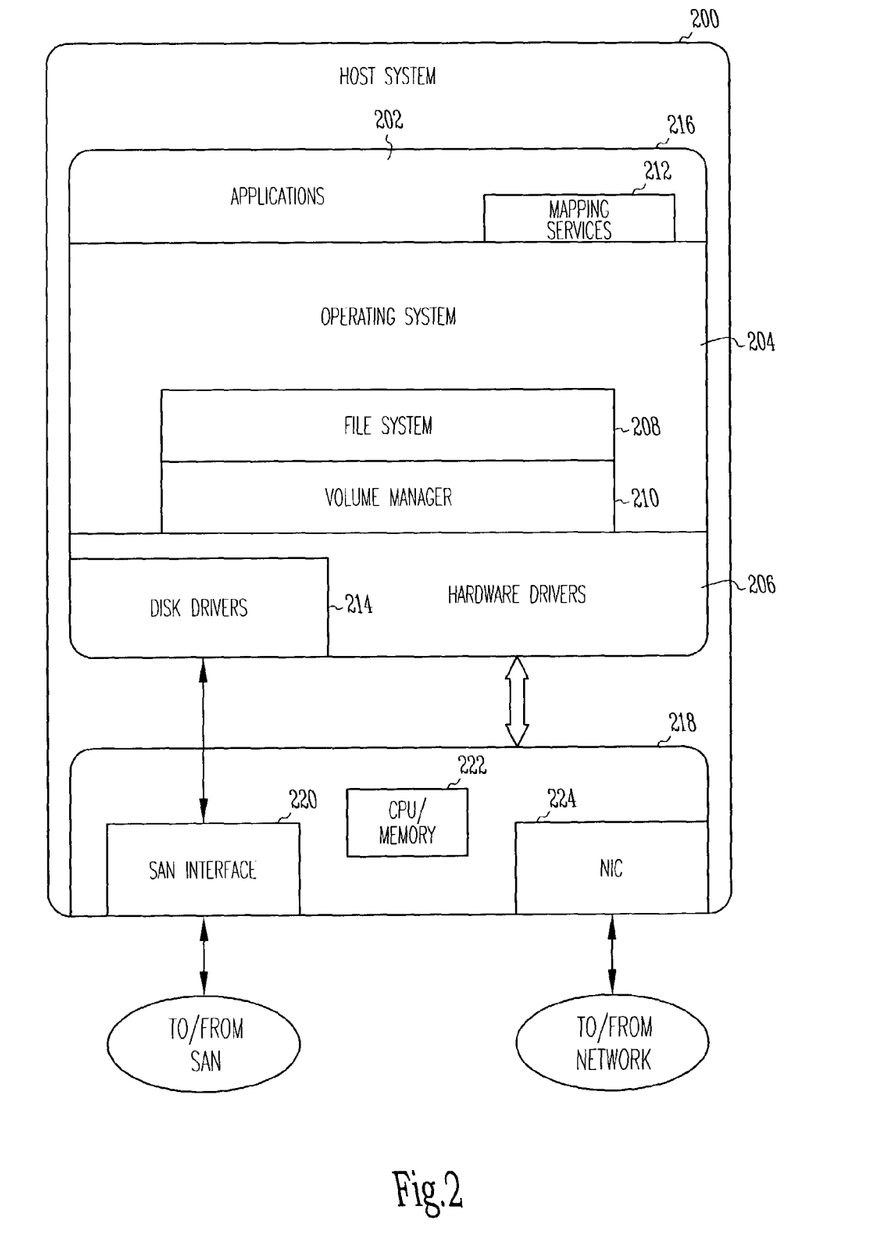
FIG. 2 is a functional block diagram of a host system in accordance with an embodiment of the present invention.

FIG. 2 is a functional block diagram of a host system in accordance with an embodiment of the present invention. Host system 200 may be suitable for use as one of computing devices 108 (FIG. 1) although other devices are also suitable. Host system 200 includes both hardware and software functional elements and for ease in understanding embodiments of the present invention, only some of the functional elements are illustrated in FIG. 2. In general, host system 200 may be a general purpose computing platform, such as a server, or a personal computer (PC), configured as described herein. Software elements 216 operating on host system 200 may include applications 202, operating system 204 and hardware drivers 206.

Operating system 204 may be any operating system including, for example, a UNIX operation system (OS), a Windows OS, a Windows NT OS, an Apple OS, or a Palm OS. In an embodiment of the present invention where a secondary host replicates files utilized by a primary host, nothing herein requires that the primary and second host operate the same or similar operating systems. Operating system 204 may implement file system 208 to manage files utilized by host system 200. In one embodiment, operating system 204 may optionally implement volume manager 210 to further manage files utilized by host system 200 and interface between file system 204 and disk drivers 214. In general, volume manager 210 may make multiple physical volumes (e.g., disks) look like a single logical volume (e.g., a concatenation of physical volumes). For example, in a SAN environment, files utilized by host 200 may be distributed across various storage elements 106 (FIG. 1). Volume manager 210, in this case, may provide an interface to file system 208 so that multiple physical storage elements appear as a signal logical storage element, referred to as a volume. Accordingly, file system 208 needs only to be concerned with locations on the one virtual storage volume and volume manager 210 may translate between volume locations and physical locations. Some of applications 202 may not use file system 208 or volume manager 210 and may directly use physical addresses of the physical storage elements. Suitable file systems and volume managers include the VxFS file system and the VxMS volume manager, both of which may be licensed from Veritas Software Corporation. Other file systems and volume managers are also suitable for use with embodiments of the present invention.

In one embodiment of the preset invention, host system 200 may include mapping services element 212. Mapping services element 212 may generate SAN-relative extent information, which may identify the actual physical locations of file extents managed and/or utilized by host system 200. In this embodiment, mapping services element 212 may serve as a mapping translator and may utilize tables, which correlate file names and local mapping. For example, mapping services element 212 may translate a file extent descriptor (e.g., file name, offset and length) to a corresponding disk extent descriptor (e.g., disk identifier, disk-offset and length).

Mapping services element 212 may also utilize tables, which provide correlations between local mapping and SAN-relative information to translate between physical locations on a SAN and local storage names utilized by file system 208. The VxMS mapping services, which may be licensed by the Veritas Software Corporation, may be suitable for use as mapping services element 212 although other mapping software may also be suitable for element 212.

In one embodiment, mapping services element 212 may be part of a file replication application used to generate local extent information for extents of files to replicate for a destination host. File extents may be specified by an application or by file system 208, and may have a predetermined size (e.g., 16 k). In this embodiment, the primary host may translate the local extent information to SAN-relative extent information, which is a form that is meaningful and unique to both the primary and second hosts. For example, a SAN-relative file extent may include a disk identifier that uniquely identifies a storage element on the SAN, while a local file extent may include a disk identifier that is usable by the local host, but generally not usable by other hosts on the SAN. In this embodiment, host 200 may be a primary host (i.e., the source host) and may be requested by a secondary host (i.e., the destination host) to provide SAN-relative extent information. The secondary host may be operating the same or a similar file replication application. The secondary host may generate local extent descriptors (e.g., a destination relative storage object name) from the SAN-relative extent information to retrieve the file extents from storage elements of the SAN. In one embodiment, the secondary host may also store the file extents on the SAN. In this embodiment, the file extents may be stored in accordance with local file extent descriptors that are different from the local file extent descriptors generated for retrieving the file extents.

In one embodiment, each individual file extent may be described by a data structure referred to as a file extent descriptor, which may identify a storage element on which the data resides and may include a byte offset and byte length of the extent. The storage element may correspond with an operating system handle for the storage element on the source host. For example, on a host operating a Windows OS, a driver letter may identify the storage element. This storage element identifier may be viewed as a source-relative storage element name. Before file extent information is sent to the destination host, the source-relative element name (i.e., a local storage object name) may be replaced with a SAN-relative element name. The destination host translates the SAN-relative element name to a form that is meaningful to the destination host. For example, the SAN-relative storage object identifier in a file extent descriptor may be replaced with an equivalent local storage object identifier. These storage element names utilized by a destination host may be viewed as destination-relative storage elements names. In one embodiment, a file replication application operating on the destination host may copy an identified file extent directly from the source disk to the target location on the destination host using the extent descriptor together with the destination-relative storage object name to retrieve the source extent. In this way, the actual file extents do not need to be transferred over an external communication network.

Hardware elements 218 may include SAN interface 220, CPU 222 and network interface 224. SAN interface may be comprised of disk controllers which may access a SAN's storage elements, such as storage elements 106 (FIG. 1). Network interface 224 may provide a network interface with an external network such as network 110 (FIG. 1) and may be comprised of one or more network interface cards (NICs.) CPU 22, among other things, may be configured to perform the operations described herein and may utilize memory (not illustrated).

Figure 3:
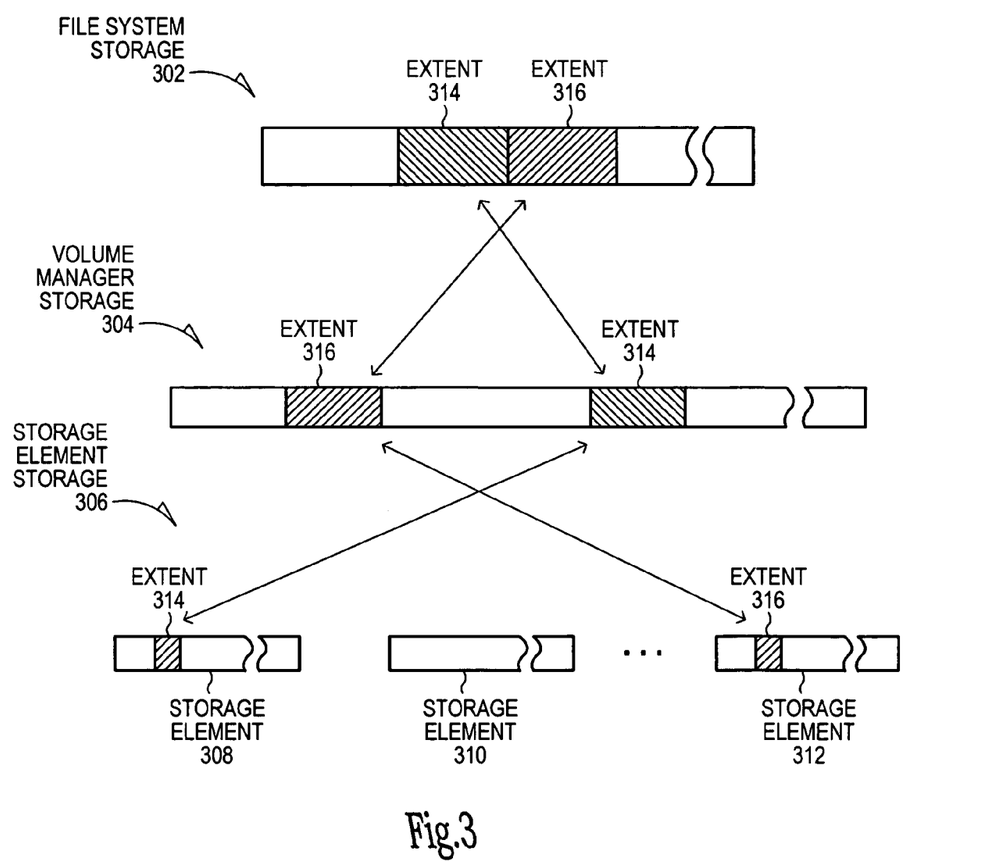
FIG. 3 illustrates file extent mapping in accordance with an embodiment of the present invention.

FIG. 3 illustrates file mapping in accordance with an embodiment of the present invention. File system storage 302 illustrates a virtual storage area, which may be utilized by a file system operating on a host system such file system 208 (FIG. 2). Volume manager storage 304 illustrates a virtual storage area, which may be utilized by a volume manager operating on a host system such as volume manager 210 (FIG. 2). Storage element storage 306 illustrates the storage area of various physical storage elements 308, 310, and 312, which may correspond with one or more of storage elements 106 (FIG. 1). As viewed by a file system, a file may be comprised of a plurality of file extents (e.g., extents 314 and 316), which may be arranged sequentially and stored on file system storage 302. Although only two extents are illustrated, a typical file may comprise many extents. A file may include any type of stored digital data including, for example, data files, graphic files, and/or application programs. File system storage 302 may be viewed as one of the storage volumes allocated to a file system where each extent may be specified by a volume offset and length. Hosts, for example, may have many file systems. To identify extent 314, an application may specify a file offset and extent length to the file system. The file system may translate to virtual locations utilized by the volume manger and may identify a volume offset on volume manager storage 304 to identify extent 314. The volume manager may then translate to locations utilized by physical storage elements, such as storage elements 106 (FIG. 1) to identify the file extent on storage element storage 306. For example, extent 314 may be identified as being on storage element 308 with a certain offset and length. In one embodiment, storage elements 308, 310 and 312 may be identified by information to uniquely identify a particular storage element of a SAN. In this way, extents of files may be identified and retrieved from physical storage locations. In accordance with an embodiment of the present invention, a file replication program may utilize tables and data structures maintained by the file system and/or the volume manager of a host to generate SAN-relative extent information from local extent information.

Figure 4:
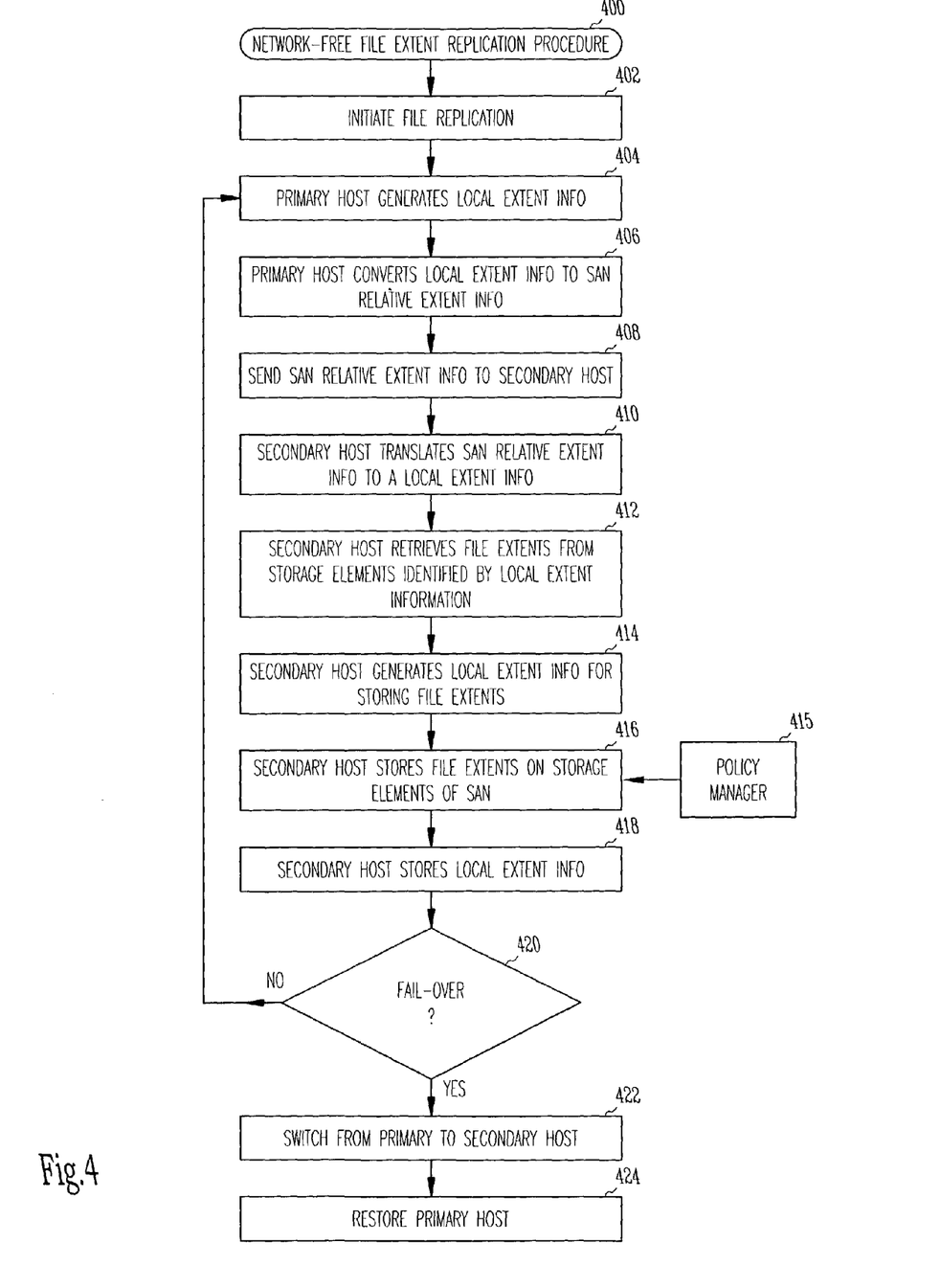
FIG. 4 is a flow chart of a file extent replication procedure in accordance with an embodiment of the present invention.

FIG. 4 is a flow chart of a file extent replication procedure in accordance with an embodiment of the present invention. File extent replication procedure 400 may be performed by software and/or hardware elements operating on a primary and second host system. Host system 200 (FIG. 2) may be suitable for performing procedure 400 although other host systems are also suitable. The performance of procedure 400 may allow the secondary host system to replicate files utilized and/or managed by the primary host system and may achieve file replication without substantial use of an external network, such external network 110 (FIG. 1). The performance of procedure 400 may also allow a secondary host system to serve as a hot standby for a primary host system in the event of a failure of the primary host system. Procedure 400 may be performed on a regular basis or may be performed continually. Operations 404 through 418 of procedure 400 may be performed for one or more individual file extents, or may be performed for an entire file, which may be comprised of a plurality of file extents. Although the individual operations of procedure 400 are illustrated and described as separate operations, one or more of the individual operations may be performed concurrently and nothing requires that the operations be performed in the order illustrated.

In operation 402, either a primary or a secondary host system may initiate file replication. When initiated by a secondary host, the secondary host may send a message to the primary host to indicate that that the secondary host is requesting SAN-relative extent information for file extents of one or more files utilized or managed by the primary host. The message may be sent over an external network such as network 110 (FIG. 1). The message may include any authorization and authentication, which may be required by the file replication application.

In operation 404, the primary host determines and/or generates local extent information, which identifies file extents and their relative location. In one embodiment, local extent information may refer to file extent information that has been translated to storage element extent information where the storage elements are identified by host-relative storage element identifiers. Operation 404 may determine a relative location of the file extents on storage elements 106 (FIG. 1) of SAN 100. Because this extent information is local to the primary host, it may not be useful to the secondary host. For example, the primary host may locally refer to a particular storage element (of the SAN) as storage element #26 on the primary host, while the secondary host may locally refer to the same physical storage element (of the SAN) as storage element #23 (relative to on the secondary host). On the primary host, the storage element is accessed as storage element #26, while on the secondary host, the same storage element is accessed as storage element #23.

In operation 406, the primary host generates SAN-relative extent information based on the local extent information determined in operation 404. Operation 406 may comprise converting the local extent information to SAN-relative extent information, which may uniquely identify the storage elements of the SAN as well as uniquely identify the location of the file extents. The SAN-relative extent information may uniquely identify one or more storage elements of the SAN.

Operation 408 routes the SAN-relative extent information over a network from the primary host system to the secondary host system. In one embodiment, an external network, such as network 110 (FIG. 1), may be utilized although other networks and methods of sending the SAN-relative extent information may be utilized. Operation 408 may include implementing techniques to secure and/or authenticate the SAN-relative extent information when, for example the primary and secondary host systems are not co-located and may communicate over non-secure communication paths.

Operation 410 converts the SAN-relative extent information to local extent information. Operation 410 may be performed by the secondary host system and may identify the local storage elements that correspond to the SAN-relative storage element identifiers. For example, operation 410 may convert a worldwide name (WWN), which uniquely identifies storage elements of the SAN, to the local names of these storage elements used by the secondary host.

Operation 412 utilizes the local extent information generated in operation 410 to retrieve the file extents identified. The secondary host system may perform operation 412 by retrieving one or more file extents directly over channel 104 (FIG. 1). Operation 412 does not require the use of network 110 (FIG. 1) for transfer of file extents.

Operation 414 is an optional operation and may generate different local extent information so that the file extents can be stored in different storage locations from those identified by the SAN-relative extent information. Operation 416 may store the file extents in accordance with the local extent information generated in operation 414. The secondary host system may perform operation 416 by storing files directly on storage elements 106 (FIG. 1) over channel 104 without use of network 110 (FIG. 1), which may be the typical way that the secondary host stores files. The local extent information used to store the file extents in operation 416 may be stored d as part of the file system or volume management system on the secondary host allowing the secondary host to utilize and/or access the replicated files.

In one embodiment of the present invention, operations 404 through 418 may be repeated for other file extents that may make up one or more files so that at this point in procedure 400, the secondary host may be able to utilize the files stored on storage elements 106 (FIG. 1) in the same way that the primary host system utilizes the files. Accordingly, the secondary host is able to serve as a hot standby in the event of a failure of the primary host. Furthermore, back-up storage may be provided in the event of failure of one or more of the storage elements storing the original files when the replicated files are stored on physically different storage elements.

In one embodiment of the present invention, policy manager 415 may be used to determine where replicated files are stored. For example, policy manager 415 may indicate that replicated files are stored in particular physical locations. The particular physical locations may be specific storage elements 106 (FIG. 1) designated as back-up storage elements. The back-up storage elements, for example, may be located in a more secure physical location than other storage elements storing primary data. Policy manager 415 may be part of a software element of a file replication program operating on the primary and/or secondary host system. Operation 414 may utilize policy manager 415 in generating local extent information.

In one embodiment of the present invention, when a file replication is initiated in operation 402, the files utilized by the primary host may be locked to prevent changes by the primary host. The file may be unlocked upon completion of replication of the file in operation 418.

In one embodiment, operations 420 through 424 may be performed. Operation 420 may respond to a failure of the primary host and operation 422 may switch operations, which are being performed by the primary host, to the secondary host. For example, if the primary host is operating a data management program, such as an airline reservations program, the secondary host may take over when the primary host fails. Although embodiments of the present invention are described for a single primary and/or single secondary host, other embodiments include the use of more than one secondary host to provide fail-over when one or more secondary host fails before a primary host may be restored.

Operation 424 may restore the primary host system. Operation 424 may include performing procedure 400 using the secondary host system as the primary host to replicate the files utilized by the secondary host thereby restoring the failed primary host system.

When operation 420 does not detect failure of the primary host, operations 402 through 418 may be repeated for other files or other file extents until files utilized and/or managed by the primary host are replicated. In one embodiment, operations 402 through 418 may be repeated on a regular basis, while in other embodiments, operations 402 through 418 may be performed after a file is changed or updated by the primary host system.

Thus, a system and method for substantially network-free file replication in a SAN has been described. The system and method reduce the use of network resources and may operate independent of the type of host operating system, file system, volume manager and storage device type.

In one embodiment, the present invention provides an article, such as computer-readable medium, having stored thereon instructions, that when executed by one or more computing platforms, result in file replication between hosts operating on SAN. The replication may include receiving SAN-relative extent information over an external network identifying storage elements of the SAN, retrieving file extents identified by the SAN-relative extent information, generating local extent information from the SAN-relative extent information, and storing the file extents on storage elements of the SAN in accordance with the local extent information. The instructions may further result in converting, by a first host system, local extent information to the SAN-relative extent information, the local extent information identifying file extents managed by the first host system to be replicated by a second host system. The second host system may perform the receiving, generating, retrieving and storing. The SAN-relative extent information may physically identify one or more storage elements of the SAN where the files are stored for access by the first host system. Generating local extent information may comprise generating local extent information to map the files to one or more storage elements of the SAN for access by the second host system.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A system, comprising:
a storage area network (SAN) including a SAN channel; and
a plurality of computing devices linked to the SAN channel, including a first host and a second host;
wherein the first host is configured to:
  initiate a replication of a file, wherein the file is managed by the second host, wherein to initiate the replication, the first host is further configured to send to the second host a request for SAN-relative extent information indicating a location of a primary version of the file;
  receive the SAN-relative extent information from the second host;
  generate local extent information from the SAN-relative extent information, wherein the local extent information comprises a storage element identifier relative to the first host; and
  complete the replication of the file using the local extent information, wherein, to compete the replication of the file, the first host is further configured to:
    retrieve at least a portion of the primary version using the local extent information; and
    select a target physical storage location within a backup storage element of the SAN at which to store a replica of the at least a portion of the primary version in accordance with a policy manager, wherein the policy manager is configured to designate a storage element of the SAN as the backup storage element based at least in part on a security of a physical location of the storage element.

2. The system as recited in claim 1, wherein the request for the SAN-relative extent information is sent over a network other than the SAN channel, wherein the SAN-relative extent information is received over the network other than the SAN channel, wherein the at least a portion of the primary version is retrieved over the SAN channel using the local extent information.

3. The system as recited in claim 1, wherein, to complete the replication of the file, the first host is further configured to:
  generate additional local extent information identifying the target physical storage location, wherein the additional local extent information comprises an other storage element identifier relative to the first host; and
  store the replica at the target physical storage location using the additional local extent information.

4. The system as recited in claim 3, wherein the first host is further configured to:
  store the additional local extent information in a storage management software layer at the first host; and
  access the replica using the additional local extent information.

5. The system as recited in claim 1, wherein, in response to the request for the SAN-relative extent information and prior to storage of the replica at the target physical storage location, the second host is configured to:
  generate additional local extent information indicating the location of the primary version of the file identified in the request, wherein the additional local extent information comprises a storage element identifier relative to the second host; and
  translate the additional local extent information into the SAN-relative extent information.

6. The system as recited in claim 5, wherein the first host is configured with a first operating system, wherein the second host is configured with a second operating system, wherein the first operating system differs from the second operating system.

7. The system as recited in claim 6, wherein the local extent information generated at the first host is generated in a format in accordance with the first operating system, wherein the additional local extent information generated at the second host is generated in a different format in accordance with the second operating system.

8. The system as recited in claim 1, wherein the first host is configured as a standby for the second host, and wherein, in response to a failure of the second host, the first host is configured to take over one or more applications from the second host.

9. The system as recited in claim 1, wherein at least a portion of the primary version of the file is stored at a SAN storage element accessed by the first host using a first local device identifier, wherein the SAN storage element is accessed by the second host using a second local device identifier, wherein the second local device identifier differs from the first local device identifier, wherein the second host comprises mapping tables used to translate the second local device identifier into at least a portion of the SAN-relative extent information, and wherein the first host comprises additional mapping tables used to translate the SAN-relative extent information into the second local device identifier.

10. A system, comprising:
a one or more processors; and
memory coupled to the processor, wherein the memory comprises program instructions executable by the one or more processors to:
  initiate a replication of a file from a first host linked to a storage area network (SAN), wherein the file is managed by a second host linked to the SAN, wherein to initiate the replication, the instructions are further executable to send from the first host to the second host a request for SAN-relative extent information indicating a location of a primary version of the file;
  receive the SAN-relative extent information from the second host at the first host;
  generate local extent information corresponding to the SAN-relative extent information at the first host; and
  complete the replication of the file from the first host using the local extent information, wherein, to complete the replication of the file, the instructions are further executable to:
    retrieve at least a portion of the primary version of the file using the local extent information; and
    select a target physical storage location within a backup storage element of the SAN at which to store a replica of at least a portion of the primary version in accordance with a policy manager, wherein the policy manager is configured to designate a storage element of the SAN as the backup storage element based at least in part on a security of a physical location of the storage element.

11. The system as recited in claim 10, wherein the SAN comprises a SAN channel, wherein the request for the SAN-relative extent information is sent over a network other than the SAN channel, wherein the SAN-relative extent information is received over the network other than the SAN channel, wherein the at least a portion of the primary version is retrieved over the SAN channel using the local extent information.

12. The system as recited in claim 11, wherein to complete the replication of the file, the instructions are further executable to:
generate additional local extent information identifying the target physical storage location, wherein the additional local extent information comprises an other storage element identifier relative to the first host; and
store the replica at the target physical storage location using the additional local extent information to access the target physical storage location.

13. The system as recited in claim 10, wherein the first host is configured with a first operating system, wherein the second host is configured with a second operating system, wherein the first operating system differs from the second operating system.

14. The system as recited in claim 10, wherein the first host is configured as a standby for the second host, and wherein, in response to a failure of the second host, the instructions are further executable to take over one or more applications from the second host at the first host.

15. A computer-implemented method, comprising:
initiating a replication of a file from a first host linked to a storage area network (SAN), wherein the file is managed by a second host linked to the SAN, wherein said initiating comprises sending from the first host to the second host a request for SAN-relative extent information indicating a location of a primary version of the file;
receiving the SAN-relative extent information from the second host at the first host;
generating local extent information from the SAN-relative extent information at the first host, wherein the local extent information comprises a storage element identifier relative to the first host; and
completing a replication of the file from the first host using the local extent information to retrieve the primary version of the file, wherein said completing the replication comprises selecting a target physical storage location within a backup storage element of the SAN at which to store a replica of at least a portion of the primary version of the file in accordance with a policy manager component of a replication program, wherein the policy manager designates a storage element of the SAN as the backup storage element based at least in part on a security of a physical location of the storage element.

16. The method as recited in claim 15, wherein the SAN comprises a SAN channel, wherein the request for the SAN-relative extent information is sent over a network other than the SAN channel, wherein the SAN-relative extent information is received over the network other than the SAN channel, wherein the primary version of the file is retrieved over the SAN channel.

17. The method as recited in claim 15, further comprising:
generating additional local extent information at the first host identifying the target physical storage location, wherein the additional local extent information comprises an other storage element identifier relative to the first host;
wherein said completing the replication of the file comprises storing the replica at the target physical storage location using the additional local extent information to access the target physical storage location.

18. The method as recited in claim 17, further comprising: storing the additional local extent information in a storage management software layer at the first host; and accessing the replica from the first host using the additional local extent information.

19. The method as recited in claim 15, further comprising:
in response to the request for the SAN-relative extent information and prior to storing the replica at the target physical storage location,
generating, at the second host, additional local extent information corresponding to a primary version of the file identified in the request, wherein the additional local extent information comprises a storage element identifier relative to the second host; and
translating, at the second host, the additional local extent information into the SAN-relative extent information.

20. The method as recited in claim 15, wherein the first host is configured with a first operating system, wherein the second host is configured with a second operating system, wherein the first operating system differs from the second operating system.

21. The method as recited in claim 15, wherein the first host is configured as a standby for the second host, further comprising:
in response to a failure of the second host, taking over one or more applications from the second host at the first host.

22. A tangible computer readable medium comprising program instructions, wherein the instructions are computer-executable to:
initiate a replication of a file from a first host linked to a storage area network (SAN), wherein the file is managed by a second host linked to the SAN, wherein to initiate the replication, the instructions are further executable to send from the first host to the second host a request for SAN-relative extent information indicating a location of a primary version of the file;
receive the SAN-relative extent information from the second host at the first host;
generate local extent information corresponding to the SAN-relative extent information at the first host; and
complete the replication of the file from the first host using the local extent information to retrieve the primary version, wherein to complete the replication, the instructions are further executable to select a target physical storage location within a backup storage element of the SAN at which to store a replica of at least a portion of the primary version of the file in accordance with a policy manager, wherein the policy manager is configured to designate a storage element of the SAN as the backup storage element based at least in part on a security of a physical location of the storage element.

23. The computer readable medium as recited in claim 22, wherein the SAN comprises a SAN channel, wherein the request for the SAN-relative extent information is sent over a network other than the SAN channel, wherein the SAN-relative extent information is received over the network other than the SAN channel, wherein the primary version of the file is retrieved over the SAN channel.

24. The computer readable medium as recited in claim 23, wherein, to complete the replication, the instructions are further computer-executable to:
generate additional local extent information at the first host identifying the target physical storage location, wherein the additional local extent information comprises an other storage element identifier relative to the first host store the replica at the target physical storage location using the additional local extent information to access the target physical storage location.

25. The computer readable medium as recited in claim 22, wherein the first host is configured as a standby for the second host, and wherein, in response to a failure of the second host, the instructions are further computer-executable to take over one or more applications from the second host at the first host.

\* \* \* \* \*